United States Patent
Rudolf et al.

(10) Patent No.: US 8,586,815 B2
(45) Date of Patent: Nov. 19, 2013

(54) METHOD FOR THE ELIMINATION OF OXYGEN, NITROGEN OXIDES, ACETYLENES, AND/OR DIENES FROM HYDROGEN-RICH OLEFIN-CONTAINING GAS MIXTURES

(75) Inventors: Peter Rudolf, Ladenburg (DE); Michael Bender, Jersey City, NJ (US); Michael Koch, Speyer (DE)

(73) Assignee: BASF SE (DE)

( * ) Notice: Subject to any disclaimer, the term of this patent is extended or adjusted under 35 U.S.C. 154(b) by 448 days.

(21) Appl. No.: 12/438,436

(22) PCT Filed: Aug. 24, 2007

(86) PCT No.: PCT/EP2007/058792
§ 371 (c)(1),
(2), (4) Date: Feb. 23, 2009

(87) PCT Pub. No.: WO2008/023051
PCT Pub. Date: Feb. 28, 2008

(65) Prior Publication Data
US 2010/0000911 A1   Jan. 7, 2010

Related U.S. Application Data

(60) Provisional application No. 60/840,026, filed on Aug. 25, 2006.

(51) Int. Cl.
*C07C 7/12* (2006.01)
(52) U.S. Cl.
USPC ........... 585/820; 585/257; 585/259; 585/262; 208/254 R; 208/293; 208/296; 208/299; 95/138; 95/145

(58) Field of Classification Search
USPC ...... 208/208 R, 246, 247, 251 R, 254 R, 299, 208/301, 302, 303; 95/133, 134, 135, 136; 585/820, 822, 275, 271, 260, 345; 502/155, 102, 400, 414, 415
See application file for complete search history.

(56) References Cited

U.S. PATENT DOCUMENTS

| 5,245,106 A | 9/1993 | Cameron et al. |
| 5,689,032 A * | 11/1997 | Krause et al. ................. 585/802 |
| 6,221,241 B1 * | 4/2001 | Carnell et al. ............ 208/251 R |

FOREIGN PATENT DOCUMENTS

| EP | 0225185 A2 | 6/1987 |
| WO | WO-2004/033598 A1 | 4/2004 |

OTHER PUBLICATIONS

Artrip, D.J., et al., "Purification of olefinic streams for polymerisation units," Petroleum Technology Quarterly, Spring 1997, pp. 103-107.

* cited by examiner

*Primary Examiner* — In Suk Bullock
*Assistant Examiner* — Candace R Chouinard
(74) *Attorney, Agent, or Firm* — Novak Druce Connolly Bove + Quigg LLP

(57) ABSTRACT

The present invention relates to a process for removing at least one component selected from the group consisting of oxygen, nitrogen oxides, acetylenes and dienes from a gas mixture comprising the at least one component and also hydrogen, one or more olefins which are not dienes and possibly further gas constituents, in which the gas mixture is brought into contact with a catalyst in a reaction zone, wherein the catalyst comprises copper(I) sulfide.

12 Claims, No Drawings

METHOD FOR THE ELIMINATION OF OXYGEN, NITROGEN OXIDES, ACETYLENES, AND/OR DIENES FROM HYDROGEN-RICH OLEFIN-CONTAINING GAS MIXTURES

RELATED APPLICATIONS

This application is a national stage application (under 35 U.S.C. §371) of PCT/EP2007/058792, filed Aug. 24, 2007, which claims benefit of U.S. Provisional Application Ser. No. 60/840,026, filed Aug. 25, 2006.

The invention relates to a process for removing oxygen, nitrogen oxides and/or acetylenes from hydrogen-rich olefin-comprising gas mixtures comprising these components.

Hydrogen-rich olefin-comprising hydrocarbon streams are obtained industrially in steam crackers (olefin plants) by thermal cracking of paraffins or in refineries by catalytic cracking of paraffins in FCC plants (FCC: fluid catalytic cracking). These cracking gases comprise light saturated hydrocarbons (paraffins) and unsaturated hydrocarbons (olefins and acetylenes) and also molecular hydrogen. In addition, impurities in the range from a few parts by million to a few percent are comprised in these cracking gases.

As desired products, olefins, mainly ethylene and propylene, are obtained, inter alia, from the cracking gases of the steam crackers or FCC plants by distillation and, if appropriate, further catalytic transformations. These products are used in chemical plants in order to produce polymers such as polyethylene or polypropylene or chemicals such as styrene, cumene, butyraldehyde or propylene oxide.

By-products formed in the cracking processes are acetylenes and dienes which are not primary desired products but can interfere in the further processing of the olefins. Particularly in steam crackers, these compounds are obtained in the percentage range and are removed there by selective hydrogenations. If the cracking gas is firstly fractionated by distillation and then selectively hydrogenated, this is referred to as tail-end hydrogenation. If the cracking gas is firstly selectively hydrogenated and then separated into the various constituents, this is referred to as front-end hydrogenation. The selective hydrogenation steps are preferably carried out using palladium-comprising catalysts in which small amounts of the noble metal are used as active component on an oxidic catalyst support. In the case of front-end hydrogenations, nickel-comprising catalysts can also be used as an alternative.

All the selective hydrogenation catalysts are sensitive to the presence of impurities which are collected on the catalyst surface as a result of adsorption. There, they interfere in various ways in the catalytic conversion of the acetylenes and dienes into olefins. Typically, the degree of conversion of the acetylenes and dienes decreases and residues of these compounds remain in the desired product stream and there cause problems in further processing.

This process, referred to as poisoning, is normally irreversible. The deactivated catalyst bed has to be replaced by a fresh catalyst bed in order to restore the desired degree of conversion. In addition, impurities such as $NO_x$, oxygen and acetylene comprised in the cracking gas can lead to corrosion problems or to blockage of plant components and therefore lead to dangers to the operating personnel and the environment and also cause economic damage. Thus, nitrogen oxides, oxygen and acetylenes in the cracking gas can lead to explosive deposits (known as "blue ice", "blue gums", "blue liquids") in the "cold box" of the steam cracker, the central heat exchanger of the low-temperature distillation plant. Explosions can occur when removing these deposits in order to avoid blockages.

Nitrogen oxides are comprised in the ppm range in cracking gases of steam crackers and especially of FCC plants. They are formed from nitrogen-comprising compounds by various oxidation processes. Oxygen is present especially in cracking gases from FCC plants. Traces of oxygen get into this stream by entrainment from the regenerator section of the FCC plant. To avoid explosive deposits, nitrogen oxides and oxygen therefore have to be removed from these cracking gases before the latter are worked up in the cold section of steam crackers. At present, nickel-comprising catalysts are used for this purpose but these convert part of the valuable olefins comprised in the cracking gas into less valuable paraffins. In addition, nickel catalysts can liberate toxic nickel tetracarbonyl in the presence of carbon monoxide in the cracking gas stream.

Further impurities comprise compounds of elements such as sulfur, arsenic, phosphorus, mercury, vanadium, cadmium or lead. These elements are likewise strong catalyst poisons and can poison the catalysts in the selective hydrogenation steps. They cannot be reacted chemically in such a way that they could remain as harmless compounds in the cracking gas. For this reason, these elements are collected on a suitable purification adsorbent by physical or chemical adsorption and thus removed from the cracking gas. Adsorbents used here are, for example, lead-oxide-comprising adsorbents which are problematical because of the environmental and health risks which they pose.

In order to carry out the purification steps mentioned, the cracking gas stream has to be passed through a number of separate purification units in which the respective chemical reactions to remove the interfering component or an adsorption is carried out. This leads to a large number of reactors and catalyst beds for purification purposes in the petrochemical plant. It is therefore desirable to carry out a plurality of purification steps simultaneously over a single catalyst and adsorption bed and thus reduce the complexity of the overall process.

WO-A 2004/033598 discloses a process for removing oxygen and acetylenes from a hydrogen-rich, olefin-comprising gas stream comprising these, as is obtained in the autothermal cracking of paraffinic hydrocarbons such as ethane. Here, the gas stream is reacted over a catalyst comprising a metal of group 10 or 11 of the Periodic Table of the Elements or its oxide on a support. Preferred catalysts comprise platinum and tin on silicon dioxide or copper on a zeolite support.

It is an object of the present invention to provide a process for removing interfering secondary components from gas streams comprising hydrogen and olefins, in which the interfering secondary components are efficiently converted into unproblematical components or adsorbed without the olefins comprised as desired products being reacted to a practically significant extent. In particular, it is an object of the invention to provide such a process for the purification of hydrogen-rich olefin-comprising cracking gas streams as are obtained in cracking (steam cracking or catalytic cracking). A further object is to provide such a process by means of which as many as possible different undesirable secondary components can be removed in one process step.

This object is achieved by a process for removing at least one component selected from the group consisting of oxygen, nitrogen oxides, acetylenes and dienes from a gas mixture comprising the at least one component and also hydrogen, one or more olefins which are not dienes and possibly further components, in which the gas mixture is brought into contact with a catalyst in a reaction zone, wherein the catalyst comprises copper(I) sulfide.

Suitable catalysts comprising copper(I) sulfide are obtained from a material comprising copper oxide CuO by reduction of the copper oxide to metallic copper and sulfidation of the copper by means of a sulfur-comprising compound. The material comprising copper oxide generally comprises from 5 to 80% by weight, preferably from 10 to 50% by weight, of CuO, preferably in admixture with a porous inert support material, for example aluminum oxide, $SiO_2$, $SiO_2/Al_2O_3$, zeolites, clays, and also other oxides or mixed oxides of Cr, Zr, Zn, Y, Ce, Sn, Ca, Sr, Mg, Ba and Ti and also mixtures thereof, for example Siraloxes, $CaTiO_3$, $MgAl_2O_4$ and $Mg_2SiO_4$. The production of the catalyst can be effected by impregnation or precipitation and can be carried out according to the prior art. The catalyst is subsequently extruded or tableted. In general, CuO is reduced to metallic copper in a hydrogen-comprising atmosphere. Suitable sulfur-comprising compounds by means of which sulfidation is carried out are hydrogen sulfide and organic sulfur-comprising compounds, in particular dialkyl disulfides such as dimethyl disulfide, diethyl disulfide and dipropyl disulfide and dialkyl polysulfides such as di-tert-butyl polysulfide. The sulfidation can be effected by passing a gas comprising the sulfidation reagent over the reduced material comprising active copper or by treating the reduced material comprising active copper with a solution of the sulfidation reagent. Reduction step and sulfidation step can also be carried out simultaneously, for example by passing a gas mixture comprising hydrogen and hydrogen sulfide over the material comprising copper oxide. After sulfidation and before use of the catalyst in the process of the invention, the catalyst can be additionally activated by means of a hydrogen-comprising stream.

In one embodiment, the catalyst comprising copper(I) sulfide is produced by reduction (activation) of the material comprising copper oxide by means of a hydrogen-comprising gas stream at a pressure of, for example, from 0.1 to 10 bar and a temperature of, for example, from 150 to 250° C. and subsequent sulfidation by means of an $H_2S$-comprising gas stream at a pressure of, for example, from 1 to 20 bar and a temperature of, for example, from 150 to 250° C. The $H_2S$-comprising gas stream comprises, for example, from 0.1 to 10% by volume of $H_2S$ in hydrogen.

In a further embodiment, the copper-comprising material which has previously been activated with hydrogen is treated with a gas stream comprising a dialkyl disulfide in hydrogen. In a further embodiment, the activated copper-comprising material is treated with a solution of dialkyl polysulfide, for example di-tert-butyl polysulfide, in a hydrocarbon solvent, for example heptane.

The catalyst is generally arranged in particulate form (for example in the form of pellets or extrudates) as a fixed bed. A plurality of such purification beds can be arranged in series in a plurality of reactors.

The catalyst preferably comprises copper(I) sulfide on a support.

The olefin-comprising gas mixture to be purified can comprise only one of the four interfering components oxygen, nitrogen oxides, acetylenes (alkynes) or dienes, two of the four components, i.e. only oxygen and nitrogen oxides, only oxygen and acetylenes, only oxygen and dienes or nitrogen oxides and acetylenes, nitrogen oxides and dienes, or acetylenes and dienes, three of the four components, i.e. oxygen, nitrogen oxides and acetylenes or nitrogen oxides, acetylenes and dienes or oxygen, acetylenes and dienes or oxygen, nitrogen oxides and dienes, or all four components.

Acetylenes are, for example, acetylene (ethyne), propyne and 1- or 2-butyne; dienes are, for example, allene or butadienes such as 1,3-butadiene or 1,2-butadiene. Nitrogen oxides are NO, $NO_2$ and $N_2O_3$, which are frequently present as a mixture. Acetylenes and dienes are frequently present together.

As olefins, the gas mixture to be purified preferably comprises ethene and/or propene.

The oxygen content, if oxygen is present, of the feed gas mixture to be purified is generally in the range from 1 ppm to 3% by volume, preferably from 1 to 2000 ppm. The nitrogen oxide content of the feed gas mixture, if nitrogen oxides are present, is generally in the range from 1 to 2000 ppm, preferably from 5 to 1000 ppm. The acetylene content of the feed gas mixture, if acetylenes are present, is generally in the range from 5 ppm to 1% by volume, preferably from 5 to 2000 ppm. The diene content of the feed gas mixture, if dienes are present, is generally in the range from 5 ppm to 1% by volume, preferably from 5 to 2000 ppm. The hydrogen content of the gas mixture is generally in the range from 1 to 70% by volume, preferably from 1 to 40% by volume. The olefin content of the feed gas mixture is generally in the range from 1 to 60% by volume, preferably from 1 to 20% by volume.

As further gas constituents, the gas mixture to be purified generally comprises alkanes such as methane, ethane, propane and butanes. In addition, it can further comprise vinylacetylene. In addition, sulfur-comprising compounds such as $H_2S$, COS, thiols or thioethers can also be comprised in the gas stream. Furthermore, the gas stream can also comprise CO, $CO_2$, $N_2$ and nitrogen-comprising compounds (e.g. $NH_3$).

As additional constituents, it is possible for higher hydrocarbons such as $C_5$ and/or $C_6$ components to be present.

In addition, the feed gas mixture can comprise toxic compounds of phosphorus, arsenic, cadmium, mercury, vanadium or lead. Examples are phosphine ($PH_3$), arsine ($AsH_3$) and Hg. These can be comprised in the gas mixture in total amounts of from 10 to 1000 ppm.

The present invention therefore further provides a process according to the invention in which the feed gas mixture comprises one or more compounds comprising phosphorus, arsenic, cadmium, mercury, vanadium and/or lead, with these being removed from the gas mixture by adsorption on the catalyst.

In general, the temperature in the reaction zone is in the range from 150 to 300° C., preferably from 150 to 275° C., and the pressure in the reaction zone is in the range from 5 to 40 bar, preferably from 5 to 35 bar. The space velocity (GHSV) is generally in the range from 500 to 3000 $h^{-1}$, preferably from 1000 to 2000 $h^{-1}$.

The process of the invention displays a very high selectivity. Thus, generally at least 98%, preferably at least 99.5%, of the interfering components $O_2$, $NO_X$, acetylenes and/or dienes are removed from the olefin-comprising gas stream to be purified. However, the olefin comprised in the gas stream is hydrogenated to only a very minor extent to the corresponding alkane, for example ethene to ethane or propene to propane. Thus, it is generally the case that less than 1% of the olefin comprised in the gas stream is hydrogenated to the corresponding alkane.

Furthermore, compounds of phosphorus, arsenic, cadmium, mercury, vanadium or lead comprised in the gas stream are likewise adsorbed on the catalyst in the process.

Thus, it is generally the case that at least 50%, preferably at least 95%, of these compounds are adsorbed by the catalyst in a purification bed.

Furthermore, an entire series of interfering secondary components can be removed by means of one and the same catalyst in the process of the invention. The catalyst can be arranged in only one purification bed or in a cascade of a plurality of purification beds connected in series. If a cascade of reactors is employed, the conditions can vary from reactor to reactor in order to achieve an optimal purification result.

EXAMPLES

Production of Sulfided Copper Catalysts

Example 1

Starting from a catalyst comprising copper oxide (45% of CuO, 16% of MgO, 35% of $SiO_2$, 0.9% of $Cr_2O_3$, 1.1% of BaO and 0.6% of ZnO), the oxidic copper was converted into elemental copper by reduction in a hydrogen-comprising atmosphere in a first step. For this purpose, 50 ml of the copper oxide catalyst in the oxidic form were introduced into a 200 ml reactor. The reactor was made inert and a hydrogen-comprising gas was passed through it under atmospheric pressure (100 standard l/h, 5% of $H_2$ in $N_2$, 200° C., 24 h). Subsequent to this reduction, the catalyst was subjected to sulfidation. For this purpose, 1% by volume of $H_2S$ in $H_2$ (total of 50 standard l/h) was passed through the reduced catalyst at 10 bar and 220° C. for 6 hours. The sulfided copper catalyst obtained in this way was subsequently analyzed. XRD no longer detected any elemental copper crystallites; rather, XRD detected $Cu_2S$ and minor amounts of $Cu_{31}S_{16}$. Elemental analysis indicated a Cu/S mass ratio of 3.78. Atomic ratios of from 1.8:1 to 2.4:1 can be obtained as a function of the conditions in the sulfidation.

The catalyst can also be successfully produced from the copper oxide catalyst by treating it directly with a mixture of $H_2S$ and $H_2$ (1% by volume of $H_2S$, 5% by volume of $H_2$, 94% by volume of $N_2$) for a period of 12 hours.

The catalyst can also be successfully produced by reacting the copper catalyst which has been reduced by means of $H_2$ with sulfur-comprising reagents such as dimethyl disulfide, diethyl disulfide or dipropyl disulfide in the presence of $H_2$ in a rotary tube.

Example 2

The catalyst can also be successfully produced by reacting the copper catalyst which has been reduced by means of hydrogen with a polysulfide in the liquid phase. For this purpose, for example, 200 g of the reduced copper catalyst were added to a solution of 35 g of di-tert-butyl polysulfide in 200 g of heptane. The solvent was subsequently distilled off at 50° C. under reduced pressure. The catalyst was subsequently dried at 50° C. and 10 mbar.

The mass ratio of Cu/S was 3.16. The catalyst was subsequently activated at 150° C. by means of a hydrogen-comprising gas (5% of $H_2$ in $N_2$).

Example 3

PuriStar R3-81, a copper-comprising catalyst, was obtained by the method described in example 1, with the CuO-comprising precursor firstly being activated in situ by means of a hydrogen-comprising gas and subsequently converted into the sulfided form by means of $H_2S$ in hydrogen.

Catalyst Test

Example 4

The experiments were carried out in a continuously operated experimental reactor (50 ml of catalyst). The individual gaseous starting components were mixed and subsequently preheated to the reaction temperature before entry into the reactor. The reaction mixture flowed from the top downward through the thermally insulated reactor provided with supplementary heating. The reaction temperature was varied in the range from 150 to 250° C. The reactor pressure was 10 bar. The temperature was measured by means of a plurality of thermocouples along the catalyst bed. The catalyst of example 3 was used in the form of pellets. After passage through the reactor, the product gas mixture was depressurized to an atmospheric pressure. The hydrocarbon components of the product gas mixture were analyzed online by means of GC. The $O_2$ concentration was likewise analyzed online. The starting gas mixture had the following composition (MAPD=methylacetylene/propadiene):

| | |
|---|---|
| Acetylene: | 20 ppm |
| MAPD: | 20 ppm |
| 1,3-Butadiene: | 20 ppm |
| 1-Butene: | 1% by volume |
| $H_2S$: | 20 ppm |
| $O_2$ | 200 ppm |
| $NO_x$: | 250 ppm |
| CO: | 3% by volume |
| $H_2$: | 20% by volume |
| $C_2H_4$ | 13% by volume |
| $C_3H_6$: | 5% by volume |
| Hg | 10 ppm |
| As | 10 ppm |
| Ethane | 0.002% |
| Propane | 0.002% |
| Methane | balance |

The reaction was carried out at temperatures of from 150 to 250° C., a pressure of 10 bar and a GHSV of 1000/h. The catalyst was preheated to a temperature of 150° C. under $N_2$ before the starting gas stream was introduced. The trial was started at 150° C. and the temperature was subsequently increased stepwise to 250° C. during ongoing operation of the reactor. The analysis of the output gave the following results:

| Temp. | 150° C. | 175° C. | 250° C. |
|---|---|---|---|
| Acetylene [ppm] | 14 | 4 | not detectable |
| MAPD [ppm] | 17 | 5.5 | 1 |
| 1,3-Butadiene [ppm] | 9 | 2 | not detectable |
| 1-Butene [%] | 1.05 | 1.03 | 1 |
| $H_2S$ [ppm] | 17 | 21 | 23 |
| $O_2$ [ppm] | 38 | 6 | <0.5 |
| $NO_x$ | 118 | 3.5 | <1 |
| CO [% by volume] | 3 | 3 | 2.9 |
| $H_2$ [% by volume] | 19.3 | 19.5 | 19.3 |
| $C_2H_4$ [% by volume] | 13.0 | 12.9 | 12.9 |
| $C_3H_6$ [% by volume] | 5.0 | 5.1 | 5.1 |
| Hg [ppm] | <100 ppb | <100 ppb | <100 ppb |
| As [ppm] | <100 ppb | <100 ppb | <100 ppb |
| Ethane [%] | 0.011 | 0.016 | 0.024 |
| Propane [%] | 0.005 | 0.007 | 0.01 |
| Methane | | balance | |

The results of the experiments are summarized in the following table:

|  | Temperature range [° C.] 150-250° C. | | |
| --- | --- | --- | --- |
|  | 150° C. | 175° C. | 250° C. |
| $NO_x$ conversion [%] | 53 | 99 | >99.6 |
| $O_2$ conversion [%] | 82 | 97 | >99.7 |
| Acetylene conversion [%] | 30 | 80 | >99 |
| Ethane formation [%] | 0.07 | 0.11 | 0.17 |
| Propane formation [%] | 0.06 | 0.1 | 0.16 |

The catalyst had a high activity for conversion of the impurities. Only small amounts of olefins were hydrogenated. The reaction of the impurities was virtually quantitative over the time of the test of 1500 hours. The catalyst was not deactivated during the test. An analysis of the used catalyst shows that arsenic and mercury had been collected on the catalyst. However, the amount of catalyst poisons collected did not result in deactivation of the active copper species. Sulfided, copper-comprising catalysts are thus well suited to the purification of cracking gases from crackers.

The invention claimed is:

1. A process for removing oxygen and acetylene from a gas mixture comprising acetylene, oxygen, hydrogen, one or more olefins which are not dienes, optionally nitrogen oxides, optionally dienes and optionally further gas constituents, comprising removing at least 98% by volume of oxygen and acetylene from said gas mixture by contacting said gas mixture with a catalyst in a reaction zone, wherein said catalyst comprises copper (I) sulfide, and wherein the temperature in said reaction zone is at least 175° C.

2. The process of claim 1, wherein said catalyst comprises copper (I) sulfide on a support.

3. The process of claim 1, wherein said gas mixture comprises dienes.

4. The process of claim 1, wherein said gas mixture comprises ethene and/or propene.

5. The process of claim 1, wherein the oxygen content of said gas mixture fed into said reaction zone is in the range of from 1 ppm to 3% by volume.

6. The process of claim 1, wherein the nitrogen oxide content of said gas mixture fed into said reaction zone is in the range of from 1 to 2000 ppm.

7. The process of claim 1, wherein the acetylenes acetylene content of said gas mixture fed into said reaction zone is in the range of from 5 ppm to 1% by volume.

8. The process of claim 1, wherein the diene content of said gas mixture fed into said reaction zone is in the range of from 5 ppm to 1% by volume.

9. The process of claim 1, wherein the hydrogen content of said gas mixture fed into said reaction zone is in the range of from 1 to 70% by volume.

10. The process of claim 1, wherein the olefin content of said gas mixture fed into said reaction zone is in the range of from 1 to 60% by volume.

11. The process of claim 1, wherein the temperature in said reaction zone is in the range of from 175 to 300° C. and the pressure in said reaction zone is in the range of from 5 to 40 bar.

12. The process of claim 1, wherein said gas mixture fed into said reaction zone comprises one or more compounds comprising phosphorus, arsenic, cadmium, mercury, vanadium, and/or lead, wherein said one or more compounds comprising phosphorus, arsenic, cadmium, mercury, vanadium, and/or lead are removed from said gas mixture by adsorption on said catalyst.

* * * * *